(12) United States Patent
Cosgrove et al.

(10) Patent No.: US 7,810,518 B2
(45) Date of Patent: Oct. 12, 2010

(54) SUB-SEA SOLENOID VALVES

(75) Inventors: Patrick J Cosgrove, High Wycombe (GB); Douglas F Kirkman, Ickenham (GB)

(73) Assignee: M. S. C. M. Limited, Marlow, Buckinghamshire (GB)

( * ) Notice: Subject to any disclaimer, the term of this patent is extended or adjusted under 35 U.S.C. 154(b) by 486 days.

(21) Appl. No.: 11/902,069

(22) Filed: Sep. 18, 2007

(65) Prior Publication Data

US 2008/0110510 A1    May 15, 2008

(30) Foreign Application Priority Data

Sep. 18, 2006  (GB)  ................... 0618193.7

(51) Int. Cl.
*F16K 31/06*    (2006.01)
(52) U.S. Cl. ............... 137/596.17; 251/129.19
(58) Field of Classification Search ............ 137/596.17; 251/129.19
See application file for complete search history.

(56) References Cited

U.S. PATENT DOCUMENTS

| 4,391,292 | A | * | 7/1983 | Millar | ................ | 137/269 |
| 5,104,091 | A | * | 4/1992 | Rathay et al. | .......... | 251/129.14 |
| 6,213,572 | B1 | * | 4/2001 | Linkner et al. | .............. | 303/155 |
| 6,577,133 | B1 | * | 6/2003 | Barron | ................ | 324/415 |
| 6,866,063 | B2 | * | 3/2005 | Avila | ................ | 137/596.17 |
| 7,165,574 | B2 | * | 1/2007 | Ryuen et al. | ........... | 137/596.17 |
| 7,513,272 | B2 | * | 4/2009 | Segi et al. | .............. | 137/625.65 |
| 2005/0029480 | A1 | * | 2/2005 | Cook | ................ | 251/129.19 |

FOREIGN PATENT DOCUMENTS

| GB | 2165923 A | 4/1986 |
| GB | 2186349 A | 8/1987 |

OTHER PUBLICATIONS

Great Britain Search Report dated May 30, 2007.

* cited by examiner

*Primary Examiner*—John Rivell
*Assistant Examiner*—Craig M Schneider
(74) *Attorney, Agent, or Firm*—Nixon & Vanderhye PC

(57) ABSTRACT

A solenoid-operated valve comprises an inlet valve member which is disposed to close in response to fluid pressure at an inlet port. A venting valve member is disposed relative to the inlet valve member so that closure of either valve member lifts the other. The valve includes at least one coil within which is a tubular assembly that forms a chamber with an operating space for the venting valve member and contains an armature for striking a rear part of the venting valve member when the coil is energised. The chamber includes a flux tube which provides a path for magnetic flux in parallel with the armature, the flux tube terminating before a region where the armature strikes the rear part of the venting valve member. A non-magnetic ring surrounds this region so that the density of the magnetic flux is increased in this region to increase the force with which the armature can strike the rear part of the venting valve member.

8 Claims, 1 Drawing Sheet

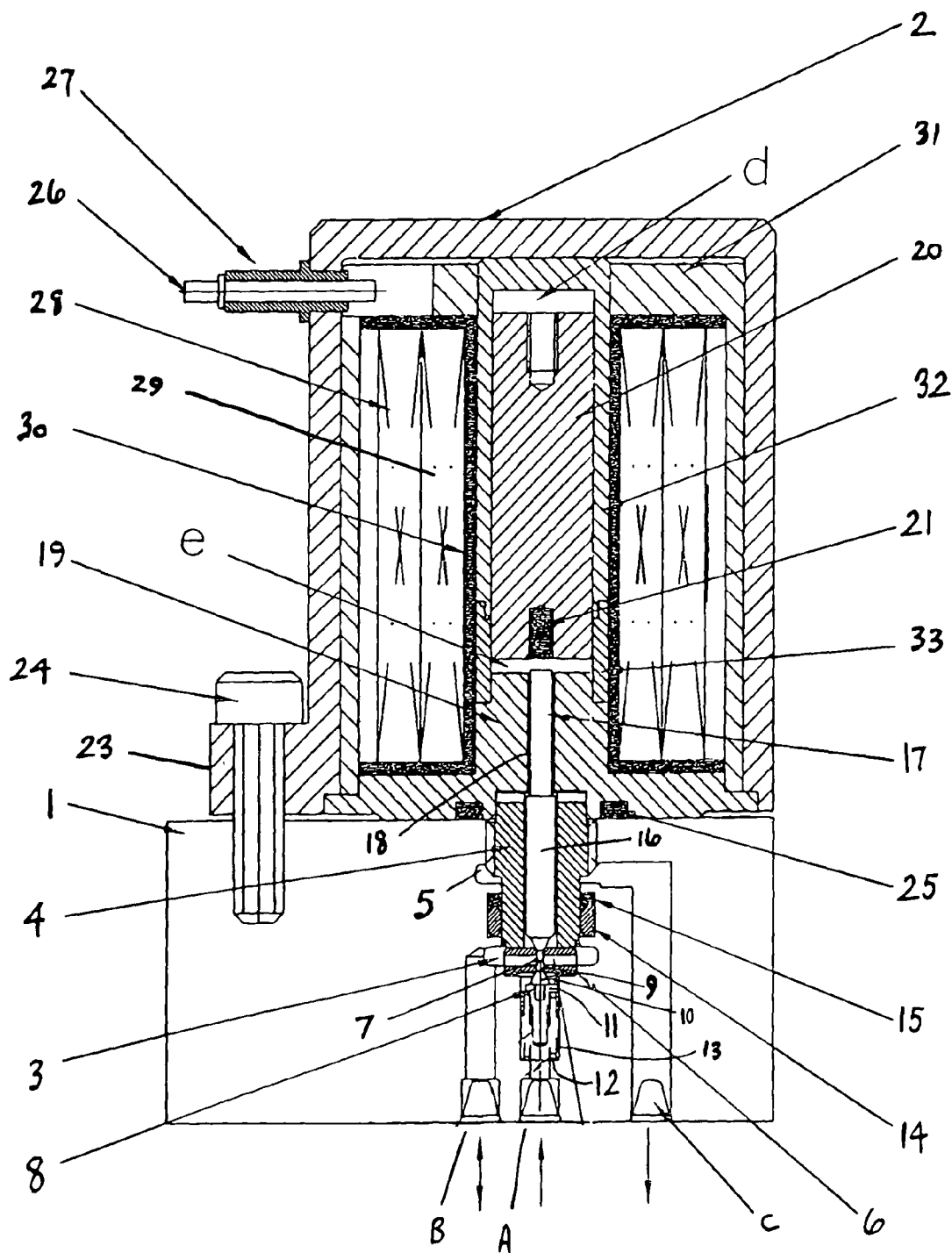

SUB-SEA SOLENOID VALVES

This application claims priority to GB 0618193.7 filed Sep. 18, 2006, the entire contents of which are hereby incorporated by reference.

FIELD OF THE INVENTION

This invention relates to sub-sea solenoid-operated valves.

BACKGROUND TO THE INVENTION

Such valves are required to operate deep in the ocean for long periods, and need to resist the ingress of sea-water and possible corrosion by it. They are required to contain working fluids of very high pressure, and to achieve small, precise and repeatable valve strokes. The present invention particularly concerns an improved design for these purposes.

SUMMARY OF THE INVENTION

A preferred embodiment of a solenoid-operated valve according to the invention comprises an inlet valve member which is disposed to close in response to fluid pressure at an inlet port. This inlet valve member is preferably a poppet having a conical head for engagement with a valve seat and a short extension, or nose, which enters a bore in the seat. The inlet valve is preferably also biased closed by a spring. The inlet valve member is opposed by a venting valve member which may be similar and which is disposed so that closure of either valve lifts the other. The arrangement is preferably such that the opening of the inlet valve member allows fluid to flow from a inlet port to a function port and opening of the venting valve member allows fluid to flow from the function port to a vent port. The inlet valve member, a valve seat, the ports and a securing member for the valve seat may constituted in a sub-assembly separable from a solenoid assembly which provides for movement of the venting valve member.

The solenoid may comprise at least one coil within which is a tubular assembly that forms a chamber with an operating space for the venting valve member. This chamber is allowed to contain working fluid by virtue of the opening of the venting valve member, but is sealed from a space containing the coils of the solenoid. The chamber contains an armature for striking a rear part of the venting valve member when the solenoid is energised.

The chamber preferably includes a flux tube which provides a path for magnetic flux in parallel with the armature; the flux tube terminates before the armature and a region where the armature strikes the rear end of the venting valve member is surrounded by a non-magnetic ring, so that the magnetic flux density is increased in this region of the armature to increase the force with which the armature can strike the rear of the venting valve member.

There follows a description of a specific example of the invention with reference to the accompanying drawing.

BRIEF DESCRIPTION OF THE DRAWING

The single FIG. 1 is a sectional view of one embodiment of a sub-sea solenoid-actuated valve according to the invention.

DETAILED DESCRIPTION

The sub-sea solenoid valve shown in the drawing comprises a body 1, in which the passageways and valve parts are disposed, and a housing 2, which contains the main parts of the operating solenoid for the valve. This body has in this example three ports A, B and C, of which port A is an 'inlet' port that would be connected to receive hydraulic fluid under pressure, port B is a function port and port C is a vent port. Within the body is a valve seat 3 which is held in the body by a hollow cylindrical screw clamp 4 located in a recess 5 aligned with the inlet port A. Below the seat 3 is a gasket 6 against which the seat is forced by the clamp 4. The seat 3 has a main through bore 7 with an identical seating at each side. The main bore has to be sized to pass the requisite flow and the expected pressure, but typically would be 0.7 mm in diameter. There are two cross-holes in the bore 3 so as to provide a flow path to the function port B. These holes are offset through the seat to minimize wear on the poppet.

The inlet valve member 8 is a poppet which has a short cylindrical nose 9 extending from a conical head 10 which seals against the seat 3. The nose 9 enters the bore 7, with a small clearance to allow the flow of fluid. The poppet is held against the seat by a resilient bias constituted by a compression spring 12 engaging a rear shoulder on the body 11 of the poppet. The body 11 and the spring 12 are disposed in a chamber 13 between the inlet port A and the valve seat. The spring 12 holds the poppet onto the seat so as both to maintain a closed condition of the valve and to seal against flow through the valve when the inlet pressure is low. When the inlet pressure is high, the unbalanced inlet pressure itself holds the poppet against the seat, so that the valve is self-sealing under high pressure. The sealing diameter at the seat should not be much larger than the diameter of the main bore, else it may be impossible for the solenoid (to be described) to open the poppet against the unbalanced inlet pressure. In this specific example, the internal pressure of the operating fluid may be of the order of 10,000 pounds per square inch 690 N/mm. The seat clamp 4 has around its lower part an O-ring seal 14 and a back-up ring 15 disposed in an annular recess in the body 1. Thereby fluid under pressure passing from the inlet port A to the function port B does not leak to the vent port C connected to the recess 5.

To achieve the full potential flow rate the 'lift' of the inlet poppet off the seat is preferably such as to provide a flow region equal in area to that of the bore in the seat. Typically the lift would be of the order of 0.1 mm.

As thus far described the assembly comprising the inlet valve poppet, the seat and the clamp constitute with the body 1 a discrete sub-assembly which needs no adjustments. This is an advantage having regard to the difficulty of achieving a precise stroke (i.e. opening movement of the valve) of the order of 0.1 mm.

Opposing the inlet poppet is a venting valve member 16, hereinafter called 'vent poppet' which has a short nose and conical head similar to those of the inlet poppet. The noses abut so that the vent poppet can close the vent passage which extends through the clamp 4 and the recess 5 to the vent port C. The vent poppet 16 can also push the inlet poppet to lift that poppet off the valve seat when the solenoid (to be described) is energised; the inlet poppet can close the inlet passage and lift the vent poppet off its valve seat when the solenoid is de-energized.

The fluid passing through the valve may be water containing anti-freeze components and other chemicals. The combination of these chemicals with sea water that may penetrate the supply system requires for the valve the use of materials which can resist degradation by such chemicals and their compounds and which can also withstand the repeated impulse loading of the poppets and seat. The seat and poppets may be made of ceramics and the poppets may be another ceramic or tungsten carbide.

The head of the vent poppet 16 is carried at the front end of a shank 17 which has a slightly larger diameter part that slides within the clamp 4 and a rear part of slightly smaller diameter which protrudes into a bore 18 in a pole cap 19. The rear end of the vent poppet 16 protrudes from the pole cap so that it can be engaged by an armature 20, which encloses an anvil 21 aligned with the shank 17 of the vent poppet 16.

The armature, in this example substantially a solid cylinder of magnetic material, is the moveable part of the solenoid. The whole assembly, including the external case and the flux tube has four functions, namely to provide a chamber at a pressure, preferably one atmosphere, that will exclude external sea water; to resist the potentially high internal pressure of the operating fluid, to provide a magnetic circuit; and to house and allow movement of the armature, so as to operate the valve assembly.

The solenoid coil assembly is contained within the cylindrical housing 2, preferably of a non-magnetic strong non-corrosive metallic material such as stainless steel. This housing has a base flange 23 which is secured to the body 1 by a plurality of screws, of which only the screw 24 is shown. The housing 2 has around its base an inner groove which accommodates the rim of the pole cap 19, which is forced into contact with the surface of the body by the aforementioned screws. The pole cap 19 has, surrounding its central bore 18 an annular groove in which an O-ring seal 25 is located, to prevent leakage of the working fluid from the venting space to the outside or the ingress of seawater into an unpressurised solenoid.

In the side wall of the housing near the top of the housing 2 are located terminal pins of which only one terminal pin 26 is shown. The pin 26 has a flanged sheath 27 and protrudes into the interior of the housing 2.

In this example the solenoid has two independently energisable electrical coils 28, 29 which have a common magnetic axis aligned with the direction of movement of the armature and the vent poppet. These coils 28 and 29 are wound on a non-magnetic, flanged cylindrical former 30, which may be made of stainless steel. Externally of the coils the magnetic circuit is completed by a permeable flux cylinder 31 which at its end adjacent the valve assembly abuts the flange of the pole cap 19. At its other end the flux cylinder 31 has an end wall which has a central opening to accommodate an inner flux tube 32 and another opening to enable electrical connections to extend between the terminal pins and the coils.

The inner flux tube 32 is closed at its top end (remote from the valve assembly) and has a cylindrical wall which extends within the former 30 towards the pole cap. The space between the armature 20 and the top of the tube 32 is denoted d. The flux tube 32 stops short of the region e wherein the armature engages the rear end of the vent poppet. From the bottom of the flux tube 32 extends a non-magnetic ring 33 which at its lower end extends between the former 30 and an annular shoulder on the pole cap 19. The ring behaves as an air-gap in the magnetic circuit. The ring is preferably made of stainless steel (such as for example 18% chrome, 8% nickel austenitic steel with a low carbon content, specific examples being 316L or 316S11) and is preferably electron-beam or friction welded to the pole cap 19, which is preferably made of a stainless magnetic material, and the inner flux tube 32, which is made of a stainless magnetic material, such as for example 18% chrome iron with a low carbon content, 430F and 430FR being specific examples.

The armature slides within the flux tube 32 and the non-magnetic ring, which are of the same internal diameter. Since, in use, working fluid will pass between the shank 17 of the vent poppet 16 and the pole cap 19 into the space e between the rear end of the poppet and the armature, the assembly has means for allowing fluid to pass easily between the ends of the armature so that the movement of the armature towards the vent poppet is not inhibited by the presence of fluid in the intervening space. In this example the armature has a small external longitudinal groove (not shown in the drawing) extending from the space e at the front of the armature to the space d at the rear of the armature. This means also balances the pressure of the working fluid on the armature.

The armature is preferably made of soft substantially pure iron, such as 'Swedish' iron. A different material such as magnetic stainless steel could be used though would provide a somewhat lesser pull. The anvil is made of a hard material, such as sintered tungsten carbide to avoid wear of the soft iron of the armature. The armature may need plating to avoid degradation by the working fluid.

The inner flux tube 32 has a permeability such that the magnetic flux produced by the solenoid coils has, within the inner space defined by the former 30, parallel paths [6] through the armature 20 and the inner flux tube 32 which surrounds the armature for the greater part of its length. For the section in which there are two parallel paths the outer path adds approximately an extra 60% to the flux carrying capability if the materials are the same. If the armature is of 'Swedish' iron the extra flux capability of the outer path would be about 40 to 50%. At the region of the inert ring 33 the flux path narrows to occupy only the armature, increasing the local flux density. Since the force in the region e is proportional to the square of the flux density, a high force, typically in excess of 5 kgs (50 newtons) can be achieved, typically in a time less than 10 milliseconds. The flux path beyond the region e passes into the pole cap 19 and is completed by the outer flux tube 31.

The solenoid assembly has two regions. One, of which the outside is defined by the housing 2 and the pole cap 19 is a 'one atmosphere' region from which sea-water is excluded; the inside of that region is defined by the pole cap 19, the flux tube 32 and the ring 33. Within the space defined by the pole cap 19, the flux tube 32 and the ring 33 there may be working fluid and possibly sea-water.

The application of pressure up to typically 10,000 psi at the inlet port will produce no flow because the inlet poppet is self-sealing and leak-tight. Energising either coil 28 or 29 will close the vent poppet and thereby open the inlet poppet, providing fluid flow to the function port. Holding the coil energized will seal the function/vent line. De-energising the solenoid seals the inlet and vents the function line connected to the function port. Opening and closing may be as rapid as 10 milliseconds and the power consumption may be reduced to less than 10 watts.

A major advantage of the construction of the flux tube is that by avoiding the use of the austenitic non-magnetic steel except for a restricted length the strength of the tube is much increased. Because the solenoid valve can be used at great ocean depths the one-atmosphere chamber enclosing the coils has to resist pressures of 500 bar (7500 psi). The armature inside the flux tube has also to be able to function at over this pressure for the return fluid to return to the surface. If the tube were entirely made of (for example) 316L steel the thickness of the tube would have to approximately doubled to withstand this pressure; the coil's size and resistivity would have to increase, as would the requirement for power to the coil.

Furthermore, the manner of construction allows the inlet poppet and seat to be assembled into a body which can carry a multiplicity of such assembles. These can be tested for sealing at both high and low pressure and left without adjustment thereafter.

The obtaining of high pressure performance from the solenoid unit requires the accurate setting of the open and closed positions of the valve parts. Adjustment may be obtained by finely removing material from the nose of the poppet to produce exactly the required stroke (which is measurable at this stage) and may be generally between 0.05 to 0.25 mm. A further adjustment is required to ensure that the armature is in the ideal position relative to the pole face. The gap (usually between 0.5 and 2.5 mm) may be adjusted by finely removing material from the small end of the shank 17.

The design of the seat in which the cross-bore is offset from the seat through-bore (which carries the poppets) ensures that the jet action of the flow on the noses of the poppets cannot move the poppets; they are backed by the seat wall which typically is only 0.07 mm. from the noses of the poppets.

The invention claimed is:

1. A solenoid-operated valve comprising:
   an inlet valve member which is disposed to close in response to fluid pressure at an inlet port;
   a venting valve member which is disposed relative to said inlet valve member so that closure of either valve member lifts the other;
   at least one electrical coil;
   a tubular assembly disposed within said coil, said tubular assembly forming a chamber with an operating space for said venting valve member and containing an armature for striking a rear part of said venting valve member when said coil is energised; wherein
   said chamber includes a flux tube which provides a path for magnetic flux in parallel with said armature, said flux tube terminating before a region where the armature strikes said rear part of the venting valve member, and a non-magnetic ring surrounding said region so that the density of said magnetic flux is increased in said region to increase the force with which the armature can strike said rear part of the venting valve member.

2. The solenoid-operated valve of claim 1 wherein each valve member is a poppet having a conical head for engagement with a valve seat and a short extension which enters a bore in said valve seat.

3. The solenoid-operated valve of claim 1 and further comprising a spring for biasing said inlet valve member closed.

4. The solenoid-operated valve of claim 1 and including a function port and a vent port and wherein opening of said inlet valve member allows fluid to flow from said inlet port to said function port and opening of said venting valve member allows fluid to flow from said function port to said vent port.

5. The solenoid-operated valve of claim 4 wherein said inlet valve member, a valve seat therefor, said ports and a securing member for said valve seat are constituted in a separable sub-assembly.

6. The solenoid-operated valve of claim 1 wherein said chamber can contain working fluid by virtue of the opening of the valve member and is sealed from a space containing said coil.

7. The solenoid-operated valve of claim 6 and including means for allowing fluid to pass between the ends of said armature whereby the movement of said armature towards said venting valve member is not inhibited by the presence of fluid in an intervening space.

8. The solenoid-operated valve of claim 1 wherein said non-magnetic ring is secured to a magnetic pole cap which has a central passage through which said venting valve member moves.

* * * * *